US007814333B2

(12) United States Patent
Choi et al.

(10) Patent No.: US 7,814,333 B2
(45) Date of Patent: Oct. 12, 2010

(54) METHOD FOR SENSING AND RECOVERY AGAINST BUFFER OVERFLOW ATTACKS AND APPARATUS THEREOF

(75) Inventors: Lynn Choi, Uijeongbu (KR); Yong Shin, Seoul (KR)

(73) Assignee: Korea University Industry and Academy Cooperation Foundation, Seoul (KR)

( * ) Notice: Subject to any disclaimer, the term of this patent is extended or adjusted under 35 U.S.C. 154(b) by 1021 days.

(21) Appl. No.: 10/598,970

(22) PCT Filed: Mar. 18, 2005

(86) PCT No.: PCT/KR2005/000776

§ 371 (c)(1), (2), (4) Date: Sep. 15, 2006

(87) PCT Pub. No.: WO2006/001574

PCT Pub. Date: Jan. 5, 2006

(65) Prior Publication Data

US 2007/0180524 A1 Aug. 2, 2007

(30) Foreign Application Priority Data

Mar. 18, 2004 (KR) ...................... 10-2004-0018279

(51) Int. Cl.
*G06F 12/14* (2006.01)

(52) U.S. Cl. ....................... 713/187; 713/189; 713/190; 726/22

(58) Field of Classification Search ................. 713/186, 713/185, 182; 379/93.02; 708/135; 726/1–36; 235/380–382.5; 705/65–69; 382/115; 902/3; 155/4–10; 704/270.1; 395/250, 877, 427; 365/73, 78, 189.12, 221; 364/239.6, 259.2, 364/933.7; 710/57

See application file for complete search history.

(56) References Cited

U.S. PATENT DOCUMENTS 6,704,871 B1 * 3/2004 Kaplan et al. ............... 713/192
2002/0144141 A1 10/2002 Edwards et al.
2003/0014664 A1 1/2003 Hentunen
2003/0172293 A1 * 9/2003 Johnson et al. ............. 713/200

FOREIGN PATENT DOCUMENTS

JP 2001216161 A 8/2001
JP 2003288129 A 10/2003
KR 1020030046581 A 6/2003

* cited by examiner

*Primary Examiner*—Pramila Parthasarathy
(74) *Attorney, Agent, or Firm*—Rothwell, Figg, Ernst & Manbeck, pc

(57) ABSTRACT

Methods and apparatuses for detecting and recovering from a buffer overflow attack are provided. A method of recovering an operation state of a processor from a buffer overflow attach includes: detecting whether a buffer overflow attack is made on any write operation while storing write operations that are potential targets of buffer overflow attacks in a predetermined location instead of an original destination to store write operations; storing the contents stored in the predetermined location at a predetermined interval in the original destination for storing write operations if no buffer overflow attack is detected and discarding unsafe write operations subsequent to a buffer overflow attack if a buffer overflow attack is detected; and ignoring the unsafe write operations subsequent to the buffer overflow attack if a buffer overflow attack is detected. Therefore, a buffer overflow attack occurring in a computer can be effectively detected, and damage of a system which is attacked can be minimized and the system can be recovered or return to the original state before the attack. A system can be effectively protected while minimizing reduction in performance of the computer system according to a method used to implement the present invention, thereby greatly improving the environments under which the computer and the Internet are used.

8 Claims, 8 Drawing Sheets

METHOD FOR SENSING AND RECOVERY AGAINST BUFFER OVERFLOW ATTACKS AND APPARATUS THEREOF

CROSS REFERENCE TO RELATED APPLICATION(S)

This application is a 35 U.S.C. §371 National Phase Entry Application from PCT/KR2005/000776, filed Mar. 18, 2005, and designating the U.S.

BACKGROUND OF THE INVENTION

1. Field of the Invention

The present invention relates to computers, and more particularly, to methods and apparatuses for detecting and recovering from buffer overflow attacks that impede the operation of a computer.

2. Description of the Related Art

The buffer overflow attack is the single most dominant and lethal form of malicious code attack as evidenced by recent worm outbreaks such as Code Red and the SQL Slammer Worm.

The present invention provides methods of detecting and recovering from such a malicious code attack.

Buffer overflow attacks usually result in abnormal behaviors such as the destruction of data or a change in a program execution flow in a system. These abnormal behaviors can be easily detected by checking the safety of instruction and data references at runtime using hardware. The present invention suggests apparatuses for checking the safety of instruction and data references and a more aggressive technique referred to as corruption recovery buffer (CRB), which can further increase the level of security. Combined with such safety guards, the CRB can be used to temporarily save suspicious writes operations resulting from a buffer overflow attack and can restore the original memory state before the attack.

Vulnerability to buffer overflows and malicious code attacks exploiting such vulnerability are considered as the most serious security problem among Internet/computer security problems. A first reason lies in that the overflow of a buffer not only corrupts data nearby the buffer but also can usurp the control of a program and execute any arbitrary code with a malicious intention. A second reason lies in that malicious code can replicate and propagate itself without any manual activation such that it has the fastest propagation speed among all forms of malicious code attacks. A third reason lies in that buffer overflow attacks originating from worm viruses, which first occurred in 1988, have persisted and are expected to continue longer than other forms. Finally, buffer overflow attacks are the most frequent form of attack among malicious code attacks.

Although various software solutions have been proposed in the forms of operating system fixes, compiler tools and patches, debugging tools, runtime libraries, etc., these techniques have not been widely adopted since they are inherently helpless in legacy applications or they often involve significant performance overhead. Still, the most prevalent forms of countermeasures are manual downloads of individual patches and fixes that are obtained by modifying and recompiling a vulnerable source code. However, this only addresses the particular vulnerability of a particular product after the vulnerability source is publicly known and is not a fundamental countermeasure.

SUMMARY OF THE INVENTION

The present invention provides methods and apparatuses for detecting and recovering from a buffer overflow attack using a malicious code that occurs in a computer.

According to an aspect of the present invention, there is provided a method of detecting a buffer overflow attack, the method comprising: (a) detecting an address indicated by a return instruction when a processor return instruction is fetched; (b) determining whether or not the detected address is in a stack area of the processor; and (c) determining that the return instruction is illegal and a buffer overflow attack is made if the detected address is in the stack area.

According to another aspect of the present invention, there is provided an apparatus for detecting a buffer overflow attack, the apparatus comprising: an address detecting unit detecting an address indicated by a return instruction when a processor return instruction is fetched; a confirmation unit determining whether or not the address detected by the address detecting unit is in a stack area of a processor; and an attack determination unit determining that the return instruction is illegal and a buffer overflow attack is made if it is determined that the address detected by the address detecting unit is in the stack area.

According to another aspect of the present invention, there is provided a method of detecting a buffer overflow attack, the method comprising: (a) detecting a return address returned to after a predetermined store instruction is executed; (b) determining whether or not consecutive store instructions in a stack area of a processor modify the return address; and (c) determining that a buffer overflow attack is made if it is determined that the consecutive store instructions modify the return address.

According to another aspect of the present invention, there is provided an apparatus for detecting a buffer overflow attack, the apparatus comprising: an address detecting unit detecting a return address returned to after a predetermined store instruction is executed; an address modification determination unit determining whether or not consecutive store instructions in a stack area of a processor modify the return address detected by the address detecting unit; and an attack determination unit determining that a buffer overflow attack is made if it is determined in the address modification determination unit that the consecutive store instructions modify the return address.

According to another aspect of the present invention, there is provided a method of recovering an operation state of a processor from a buffer overflow attack, the method comprising: (a) detecting whether a buffer overflow attack is made on any write operation while storing write operations that are potential targets of buffer overflow attacks in a predetermined location instead of an original destination to store write operations; (b) storing the contents stored in the predetermined location at a predetermined interval in the original destination for storing write operations if no buffer overflow attack is detected and discarding unsafe write operations subsequent to a buffer overflow attack if a buffer overflow attack is detected; and (c) ignoring the unsafe write operations subsequent to the buffer overflow attack if a buffer overflow attack is detected.

According to another aspect of the present invention, there is provided an apparatus for recovering an operation state of a processor from a buffer overflow attack, the apparatus comprising: a storing unit storing write operations that are potential targets of buffer overflow attacks in a predetermined storage unit, which is not a memory unit originally designated to store write operations; an attack detecting unit detecting whether or not a buffer overflow attack is made on any of the write operations; a storage management unit storing the contents stored in the predetermined storage unit in a memory unit which is originally designated to store write operations at a predetermined interval if no buffer overflow attack is detected and discarding unsafe write operations subsequent to a buffer overflow attack if a buffer overflow attack is detected; and a write management unit ignoring the unsafe write operations subsequent to the buffer overflow attack and not storing the unsafe write operations in the predetermined storage unit if a buffer overflow attack is detected.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

In general, a buffer overflow attack results in unusual symptoms or traces, which can be simply detected by hardware. For example, the most common form of buffer overflow attack referred to as stack smashing modifies a return address in a local stack frame of a process, which is not possible in a normal program execution. Likewise, the execution of malicious codes often requires instruction fetches from the stack or data region of a program's address space, which is also not common in a normal program execution.

To detect such abnormal symptoms, the present invention provides a microarchitecture technique called "safety guard", which verifies the safety of instruction and data references by checking the range of addresses of those references. The present invention also provides a more aggressive hardware technique called "corruption recovery buffer" (CRB), which can be used to recover the system from such attacks by saving suspicious write operations.

Figure 1:
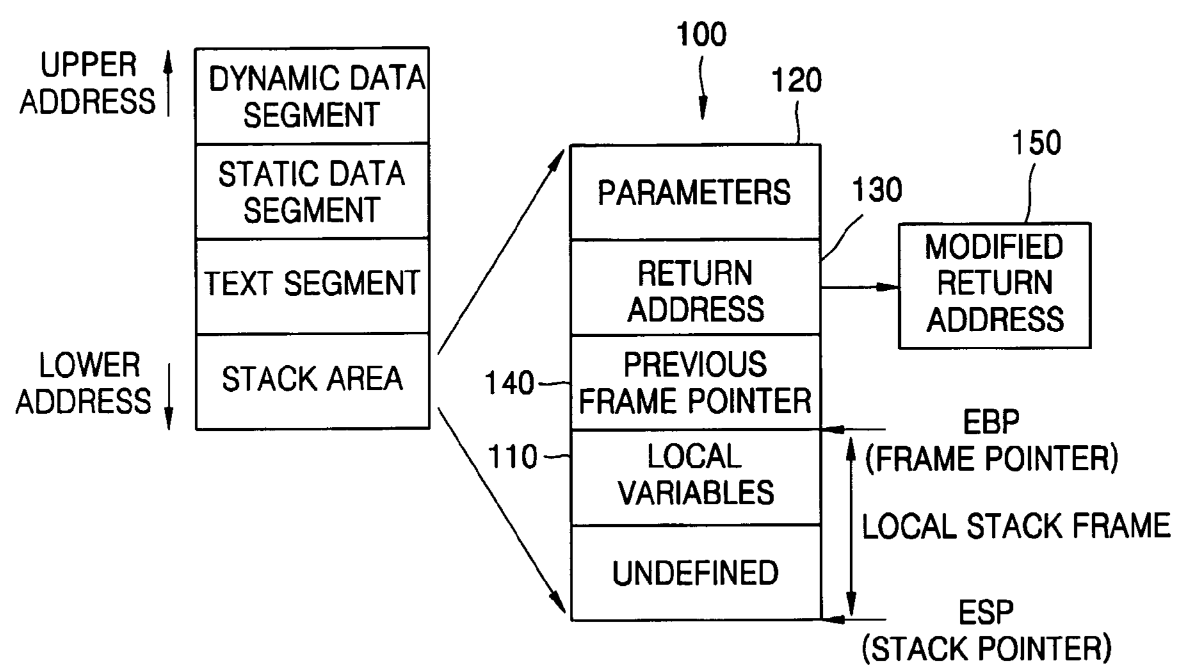
FIG. 1 illustrates how a stack smashing attack can modify a return address in an x86 processor.

A buffer overflow attack starts by corrupting data nearby an overflowed variable. Since a program text region of a process address space is write-protected, only data regions, such as stack, heap, or static data, can be corrupted. FIG. 1 illustrates how a stack smashing attack can modify a return address in an x86 processor.

In an x86 processor of FIG. 1, EBP indicates the bottom of a stack, ESP indicates the top of the stack, and an area defined by EBP and ESP is a stack frame 100 for one procedure. In the stack frame 100, local variables 110, parameters 120, a return address 130, and a previous frame pointer (EBP) 140 are stored. The local variables 110 or the parameters 120 are buffer variables that are targets of buffer overflow attacks. Due to a buffer overflow attack, data in an area of the stack is overwritten with data in a near, lower area of the stack, thereby modifying the return address 130. In general, the modified return address 150 indicates a start address of a malicious code input from the outside. When a function that is currently attacked returns, the process returns to the modified return address 150 and the malicious code begins to be executed.

When a vulnerable function like strcpy reads an input for a local variable, the external input may overflow nearby locations in the function's stack frame and can eventually corrupt the return address.

Figure 2:
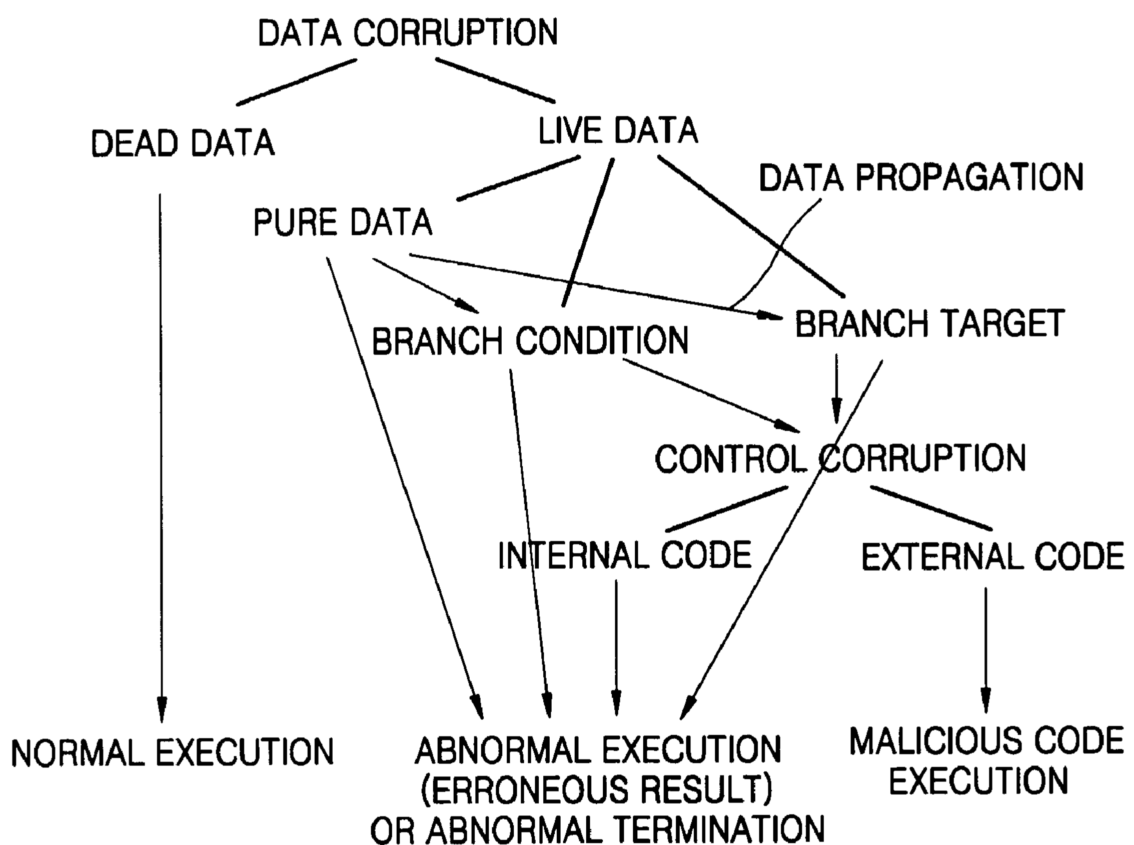
FIG. 2 is a diagram illustrating types of control or data corruptions resulting from a buffer overflow attack.

FIG. 2 is a diagram illustrating types of control or data corruptions resulting from a buffer overflow attack. Depending on when and where data is corrupted, the data corruption may or may not lead to an erroneous program execution. If the corrupted data item is never referred to in the future, the corrupted data will not affect the execution of the program. Hereinafter, this type of data corruption will be referred to as "dead data corruption". If the same attack occurs to the same location earlier, the data will be referred to and will cause a serious problem. Thus, the impact of data corruption not only depends on its location but also on the timing of the attack. A case where a corrupted data item is referred to in the future will be referred to as "live data corruption".

Live data corruption can be further classified into three categories. First, if the corrupted data is used as a target address of a control transfer instruction, such as return or an indirect branch, this data corruption is referred to as "branch target corruption". In this case, when an instruction is fetched from the modified branch target, the flow of execution of the program is altered. Most buffer overflow attacks try to use this kind of control data corruption to launch a malicious code attack, targeting the return address in the stack frame of function pointers in the stack or other data regions, such as heap.

A second category of data corruption occurs when an attack modifies the branch condition of a control transfer instruction. This may also lead to the modification of a program control flow although it does neither alter the return address nor a function pointer. Hereinafter, this will be referred to as "branch condition corruption". For example, in a sample code below, a different function can be invoked depending on the value of variable "a":

if (a>0) then call func_a(a) else func_b(a);

That is, if the value of variable a is corrupted, another function instead of a normal function is invoked to alter the flow of control.

All other forms of live data corruption, excluding the above-described forms of live data corruption, will be collectively referred to as "pure data corruption". This may not directly change the flow of control but modifies the live data, which will be referred to by the program later. Although the program seems to be normally executed, it can lead to an erroneous result or state. In addition, the data corruption may propagate to other data locations, which can eventually lead to branch target corruption or branch condition corruption.

All the above-described three types of live data corruption may lead to an abnormal execution or termination. Referring to the corrupted data item is susceptible to data reference exceptions or execution related errors caused by invalid data operands. For example, the load from a corrupted data address may result in a TLB miss, a page miss, or an access violation. Although the corrupted data item is successfully referred to, it may cause execution related exceptions such as overflow or floating-point exceptions when used in a later arithmetic operation.

When a corrupted data item is used as a branch condition of a conditional branch or a branch target of an indirect branch, the execution control flow is modified. In particular, a case where an instruction is fetched from a wrong target address is referred to as "control corruption", which implies that an illegal control flow occurs as a result of a buffer overflow attack. This may lead to the execution of a malicious code if the branch target is modified to a pointer indicating a worm code input from the outside. Hereinafter, this control corruption will be referred to as "external code control corruption". This is the most serious consequence of buffer overflow attacks since the malicious code can replicate and propagate to other vulnerable hosts. Also, this is the most common form of buffer overflow attack. Another form of control corruption occurs when the modified branch target points to a legitimate code in a text region. This will be referred to as "internal code control corruption".

Hereinafter, a safety checking process of detecting a buffer overflow attack according to the present invention will be described.

The flow of safety checking to detect a buffer overflow attack according to the present invention will now be described.

A system under an attack exhibits abnormal behaviors during its data and instruction references. For example, a stack smashing attack modifies a return address as well as local variables in the stack and often copies its accompanying malicious code into a stack area outside the current stack frame, neither of which is possible during a normal program execution. In addition, an attacked program fetches instructions from the stack area. Except for a few rare cases, such as Linux "signal handlers" or gcc "trampolines" functions, it is unusual to fetch instructions from the stack. Both abnormal instruction reference and abnormal data reference can be easily detected by checking the safety of an address which is being referred to.

Figure 3:
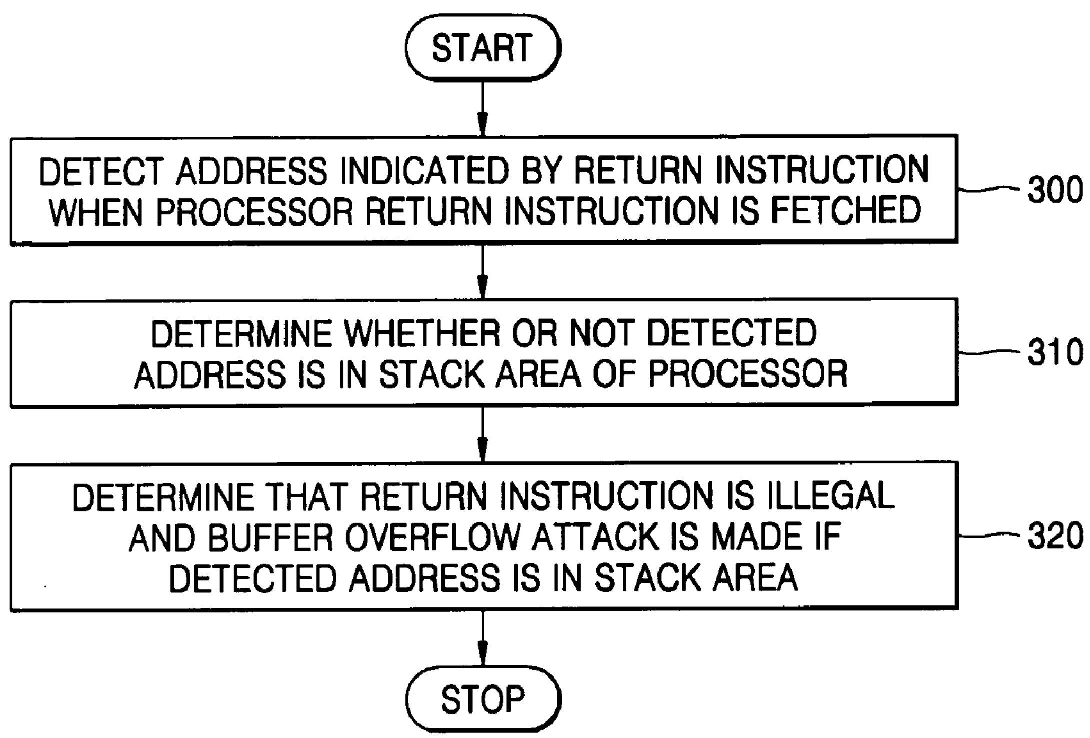
FIG. 3 is a flowchart of a method of detecting a buffer overflow attack according to an embodiment of the present invention.

FIG. 3 is a flowchart of a method of detecting a buffer overflow attack according to an embodiment of the present invention.

This method involves detecting an address indicated by a return instruction when a process return address is fetched (operation 300), determining whether the detected address exists in a stack area of the processor (operation 310), and determining that the return instruction is illegal and a buffer overflow attack is made if the detected address exists in the stack area (operation 320).

Figure 4:
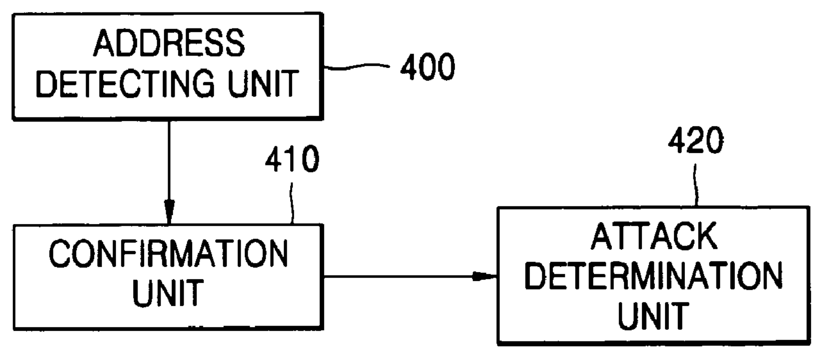
FIG. 4 is a block diagram illustrating a structure of an apparatus for detecting a buffer overflow attack according to the method of FIG. 3.

FIG. 4 is a block diagram illustrating a structure of an apparatus for detecting a buffer overflow attack according to the method of FIG. 3.

The apparatus in FIG. 4 includes an address detecting unit 400, which detects an address indicated by a return instruction when a processor return instruction is fetched, a confirmation unit 410, which determines whether or not the address detected by the address detecting unit 400 is in a stack area of the processor, and an attack determination unit 420, which determines that the return instruction is illegal and a buffer overflow attack is made when it is determined that the address detected by the address detecting unit 400 exists in the stack area.

In this case, it is preferable that the attack determination unit 420 does not execute and discards the return instruction determined to be illegal.

A case where the present invention is implemented in a processor, such as a central processing unit (CPU), will be described in detail. It will be described below how a processor can protect a system against data or control corruption resulting from a buffer overflow attack.

Ultimately, the apparatus of FIG. 4 operates as follows when fetching an instruction from a processor.

When an address indicated by a return instruction exists in a stack area, the apparatus of FIG. 4 determines the return instruction to be illegal.

If a program counter points to a location in the stack area, the corresponding instruction is determined to be unsafe and thus is discarded. However, this method may raise problems when an instruction has to be fetched from a stack area as in gcc trampoline functions or Linux signal handlers.

Since most malicious codes causing buffer overflows overwrite return addresses, an instruction changing control into a stack area becomes a return instruction. Trampolines functions or Linux signal handlers are called not by a return instruction but by a call instruction. Accordingly, by checking whether or not a target address of a return instruction indicates a stack area, normal instructions by trampolines functions can be distinguished from abnormal instructions by malicious code attacks. This type of safety checking during the execution of an instruction is referred to as "safety guard", and a specific reference safety checking for a return instruction is referred to as "instruction reference safety guard".

This is simple range checking and can be implemented using hardware in the present invention without a substantial increase in costs or loss of performance.

Since most external malicious codes can reside only in a stack area of the program's address space, external code control corruptions due to buffer overflow attacks can be effectively eliminated through an instruction reference safety guard. However, it is difficult to prevent internal code control corruptions in which instructions are fetched from text regions. In addition, in an instruction reference safety guard, because only a branch target address, not a branch condition, is checked, it is also difficult to prevent control corruptions occurring due to branch condition corruptions.

It is advantageous to detect and deter an attack at an early stage of the attack. Accordingly, protecting a system during a data corruption can more effectively reduce damage to the system than protecting the system after the data corruption. Another safety guard measure illustrated in FIG. 5, in addition to the above-described instruction reference safety guard, can be applied when a data corruption occurs.

Figure 5:
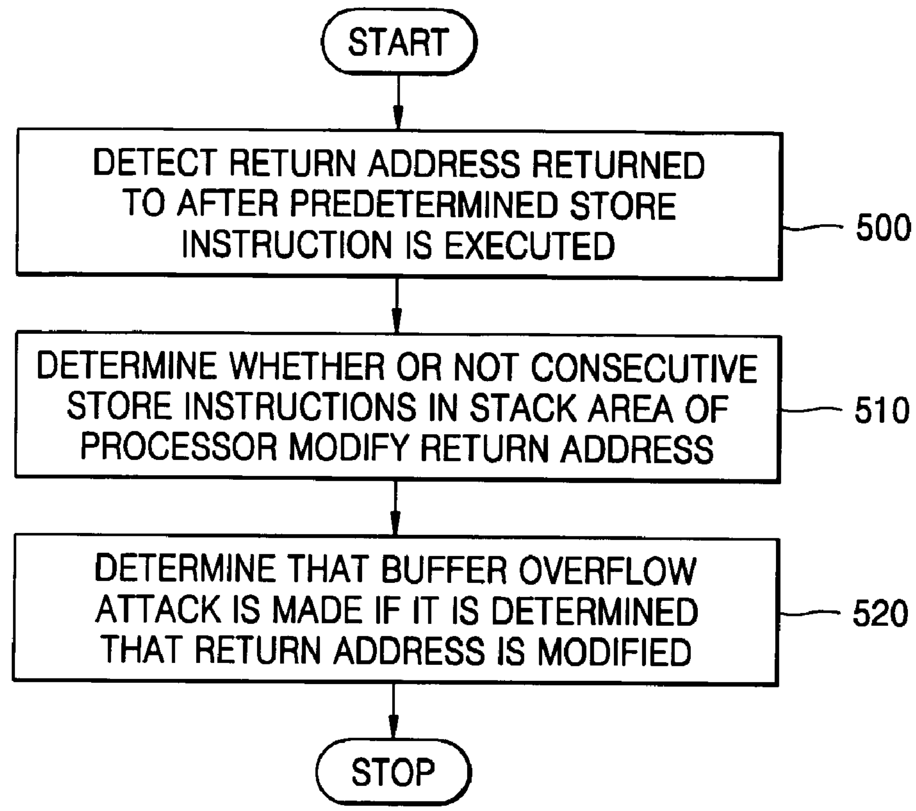
FIG. 5 is a flowchart of a method of detecting a buffer overflow attack according to another embodiment of the present invention.

FIG. 5 is a flowchart of a method of detecting a buffer overflow attack according to another embodiment of the present invention.

The method of FIG. 5 includes detecting a return address returned to after a predetermined store instruction is executed (operation 500), determining whether consecutive store instructions in a stack area of a processor modify the return address (operation 510), determining that a buffer overflow attack is made if it is determined in operation 510 that the consecutive store instructions modify the return address (operation 520).

Figure 6:
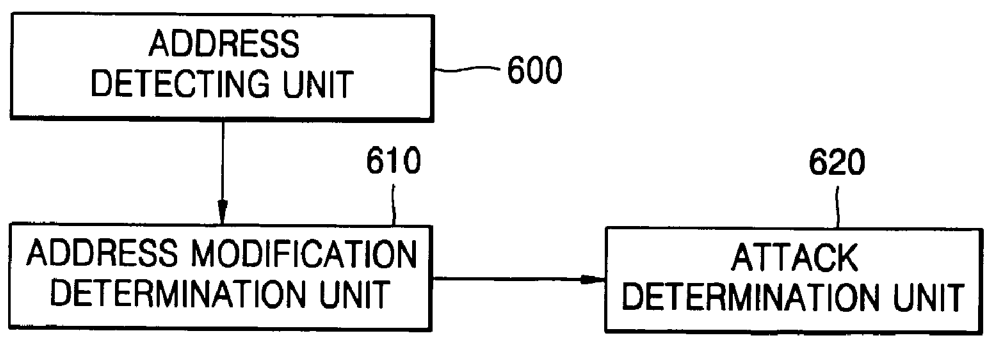
FIG. 6 is a block diagram of a structure of an apparatus for detecting a buffer overflow attack according to the method of FIG. 5.

FIG. 6 is a block diagram of a structure of an apparatus for detecting a buffer overflow attack according to the method of FIG. 5.

The apparatus of FIG. 6 includes an address detecting unit 600, which detects a return address returned to after a predetermined store instruction is executed, an address modification determination unit 610, which determines whether or not consecutive store instructions in a stack area of a processor modify the return address detected by the address detecting unit 600, and an attack determination unit 620, which determines that a buffer overflow attack is made if it is determined in the address modification unit 610 that the consecutive store instructions modify the return address.

Ultimately, the apparatus of FIG. 6 operates as follows. If consecutive store instructions in a stack area modify the return address, the apparatus determines that this operation is abnormal.

By checking the address range of consecutive store instructions with respect to the location where a return address is stored, the system can be protected against return address or frame pointer corruption resulting from stack smashing attacks. This type of safety guard is referred to as "data reference safety guard", which can effectively deter control corruption resulting from stack smashing by protecting the return address from modification. To enforce this safety guard, the location of a stack where the return address is saved has to be identified. To this end, the address detecting unit 600 may store in a predetermined stack a return address returned to after a predetermined store instruction is executed (operation 500). The address modification determination unit 610 may determine whether the range of the consecutive store instructions overlaps with the location of a return address stored in the stack and determine that the return address is violated and modified if the range of the consecutive store instructions overlaps with the location of the return address stored in the stack.

To describe the data reference safety guard in detail, the concept of a return address pointer stack (RAPS) is used in the present invention.

Figure 7:
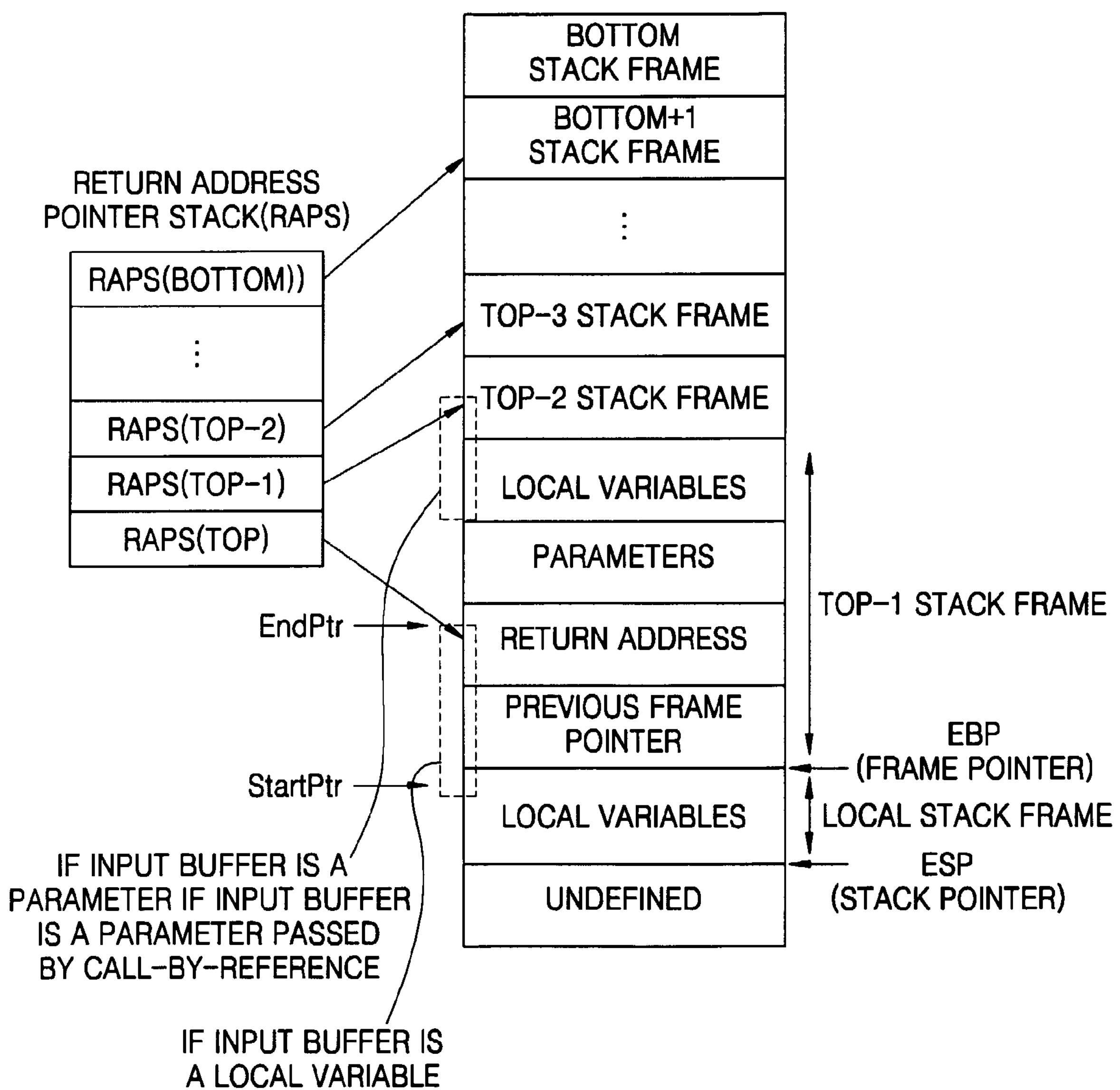
FIG. 7 illustrates a structure of a return address pointer stack (RAPS) according to the present invention.

FIG. 7 illustrates a structure of RAPS according to the present invention. Whenever a return address is saved in the stack, the address of the return address is pushed to RAPS. Whenever a stack address is loaded from the stack, RAPS is popped. Multiple POP operations as expressed below can simultaneously occur in case of setjmp and longjmp operations used in x86 processors.

while (RAPS(top)<ESP) pop RAPS;

Whenever two consecutive store operations occur from a lower address to a higher address in contiguous locations in the stack, the RAPS starts to keep a track of the range of the consecutive store operations using two pointers, StartPTr and EndPtr, which respectively indicate start and end points. If the range of the consecutive store operations violates the locations pointed by RAPS top entries (i.e., if the range of the consecutive store operations overlaps with the addresses stored in the RAPS), a data reference safety guard signals a safety violation.

Most buffer overflow attacks corrupt return addresses stored near the top of the stack frame. If an overflowed variable is a local variable in the current stack frame, then the return address in the previous stack frame is modified by a malicious code. However, if an overflowed variable is a parameter passed via call-by-reference by a pointer, an actual buffer overflow occurs in the previous stack frame, and the return address in a stack frame one below the previous stack frame is modified. In other words, when an overflowed parameter is passed via call-by-reference, a buffer overflow attack can occur in any stack frame. Accordingly, the range of consecutive store operations has to be checked for all the values in the RAPS. However, since most attacks target return addresses near the top of the stack, checking only a few top return addresses can be enough.

A data reference safety guard apparatus operating as described above costs more to implement using hardware than an instruction reference safety guard apparatus, but provides a higher level of protection against control and data corruptions.

Recovery of the Original State from a Buffer Overflow Attack

When a safety guard apparatus according to the present invention as described above, which can be implemented using a device, such as a processor, detects insecure memory references, there are a few optional methods to cope with.

A first optional method is to terminate a process under attack. However, this leads to a denial of service condition since the attacker at least succeeds in terminating the process.

A second optional method is to terminate the invocation of a currently attacked function and coercively returns its control flow to a caller. This is referred to as "compulsory return." This is possible because the apparatus according to the present invention can track the location of the return address and coercively change the value of a program counter (PC).

A third optional method is to ignore all unsafe store operations and keep the original control flow of the program. This is referred to as "calm recovery". This method does not alter the original control flow and may cause an abnormal execution due to data corruptions for local variables.

The final optional method is to recover the original state and return to a caller. However, this method requires a hardware storing unit or buffer for storing a previous or new architectural state of the buffer.

According to the present invention, when detecting a buffer overflow attack, a combination of the above-described methods can be used as a recovery or return technology. Each of the recovery or return methods will be described below in detail.

Compulsory Return

This is a simple hardware solution to terminate an attacked function and coercively change its control flow to return to a caller. This can be accomplished by updating a program counter with the value of a return address stored in the stack and popping up the current stack frame. In many cases, the purpose of an attacked function is only to copy an external input to a local variable. Thus, in most cases, it is usually safe to discard the input since an overflowed variable contains only malicious codes.

Calm Recovery

This method is to simply ignore all unsafe write operations resulting from an attack. Since the data reference safety guard apparatus protects return addresses, an attack cannot intercept the control, and a process under attack will continue to be normally executed after the attack ends. Since the processor silently ignores only unsafe write operations and does not change the original control flow to the attacked process, this is referred to as "calm recovery". Accordingly, this method is less intrusive than the compulsory return method. However, this method is vulnerable to data corruption and may cause an abnormal execution since local variables in a stack frame are corrupted before the data reference safety guard apparatus alerts the safety violation.

Corruption Recovery Buffer (CRB)

This is a more aggressive solution to recover the original buffer state after an attack is detected. To this end, suspicious write operations are saved in a special hardware buffer referred to as a corruption recovery buffer (CRB). When a data reference safety guard violation occurs, the processor discards all unsafe values in the CRB, silently ignores all the following unsafe writes, and completes all the following operation as in calm recovery. By doing so, the input buffer of the memory remains intact, and thus any kind of data corruption in the stack area can be avoided.

Figure 8:
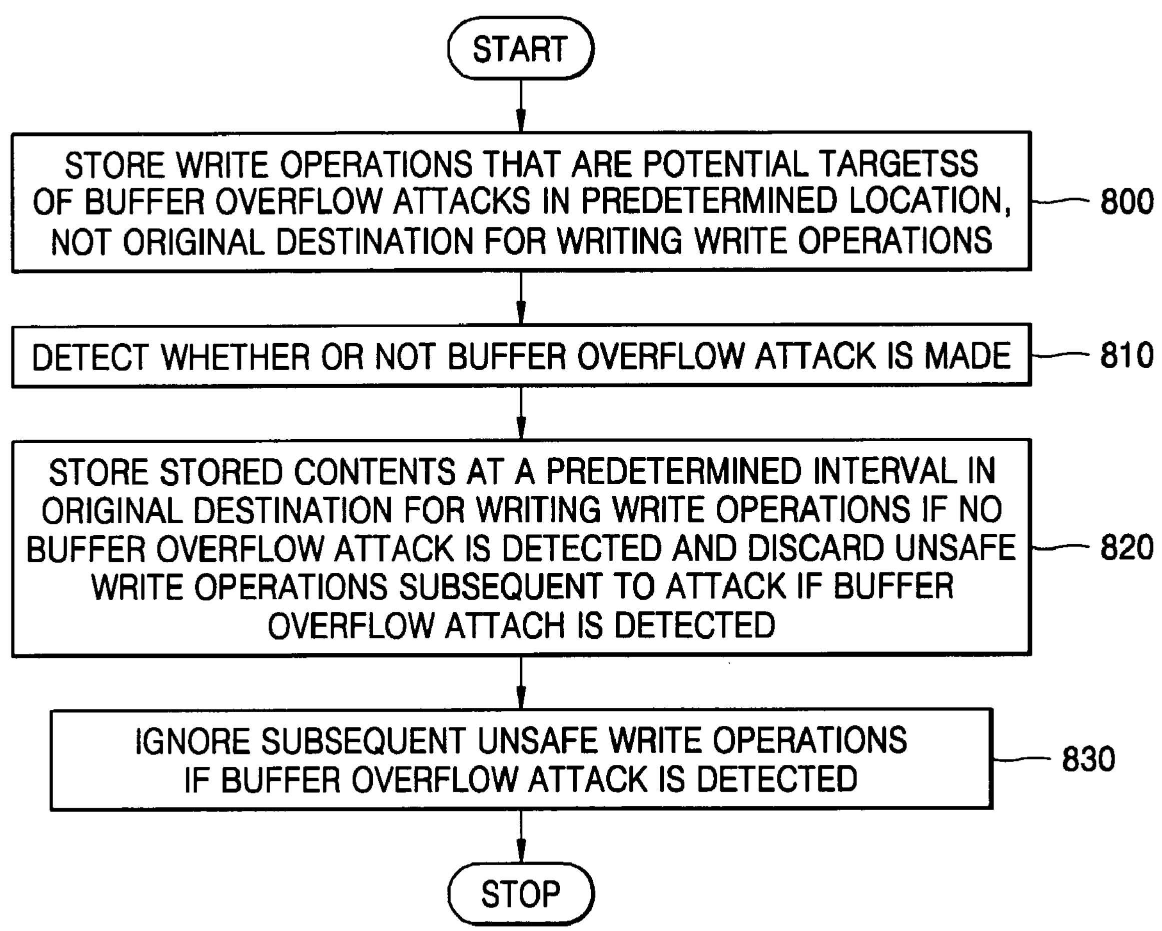
FIG. 8 is a flowchart of a method of recovering from a buffer overflow attack using a corruption recovery buffer (CRB) according to the present invention.

FIG. 8 is a flowchart of a method of recovering from a buffer overflow attack using CRB according to the present invention.

This method of recovering an operation state of a processor includes saving write operations that are potential targets of buffer overflow attacks in a predetermined area, not in an original destination for writing write operations (operation 800), and simultaneously detecting whether or not a buffer overflow attack is made on any of the write operations (operation 810). If a buffer overflow attack is not detected, the saved contents are stored at a predetermined interval in the original destination where the write operations are to be recorded. If a buffer overflow attack is detected, write operations that are unsafe due to the attack are discarded (operation 820). If a buffer overflow attack is detected, subsequent unsafe write operations are ignored (operation 830).

Figure 9:
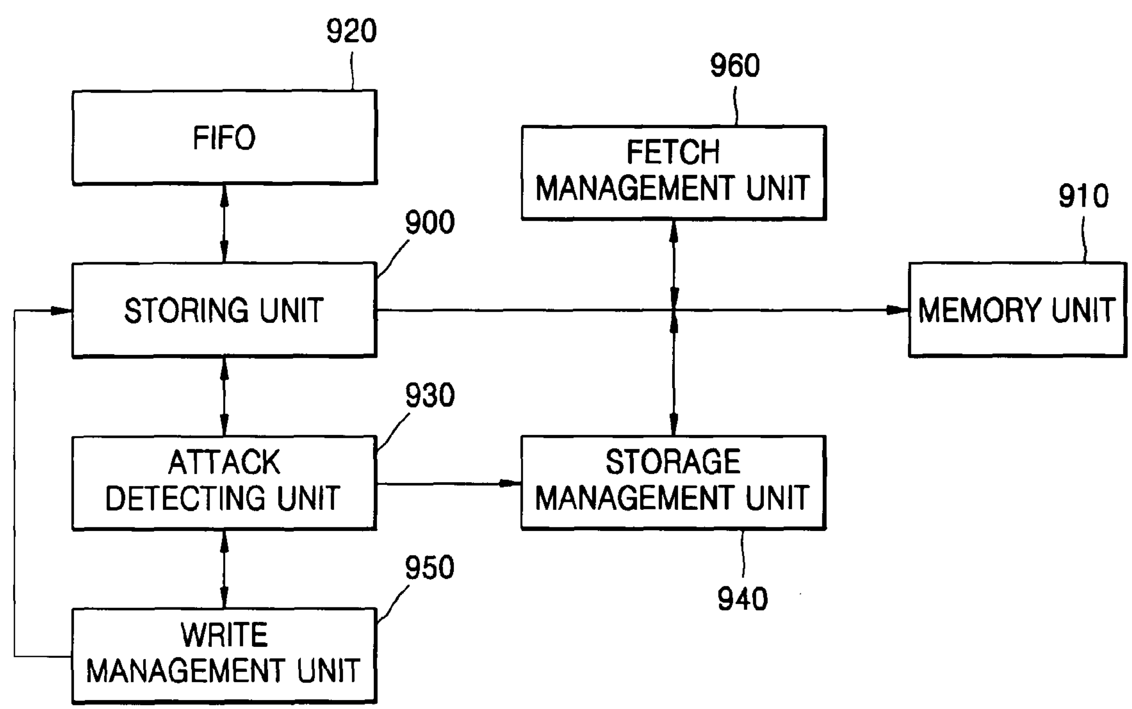
FIG. 9 is a block diagram of a structure of an apparatus for recovering from a buffer overflow attack according to the method of FIG. 8.

FIG. 9 is a block diagram of a structure of an apparatus for recovering from a buffer overflow attack according to the method of FIG. 8.

The apparatus for recovering an operation state of a processor from a buffer overflow attack includes a storing unit 900, which stores write operations that are potential targets of buffer overflow attacks in a predetermined storage unit 920, not in a memory unit 910 which is an original destination to store the write operations; an attack detecting unit 930, which detects whether or not a buffer overflow attack is made on any of the write operations; a storage management unit 940, which stores the contents saved in the predetermined storage unit 920 in the memory unit 910, which is an original destination to store the write operations, at a predetermined interval if no buffer overflow attack is detected, and discards unsafe write operations subsequent to a buffer overflow attack if a buffer overflow attack is detected; and a write management unit 950, which ignores subsequent unsafe write operations and does not store the subsequent unsafe write operations in the predetermined storage unit 920 if a buffer overflow attack is detected.

In addition, the apparatus further includes a fetch management unit 960, which manages a read operation in the memory unit 910, which is an original destination to store write operations. When there is a need to read data from the memory unit 910 storing the write operations, the fetch management unit 960 simultaneously accesses the memory unit 910 and the predetermined storage unit 920 in which data is saved by the storing unit 900, and if a destination address for a read operation is in the predetermined storage unit 920 but is not yet stored in the memory unit 910, it is preferable that data for the read operation is provided from the predetermined storage unit 920. The predetermined storage unit 920 in which data are stored by the storing unit 900 may be a first-in-first-out (FIFO) device.

In addition, when a buffer overflow attack is detected, the storage management unit 940 may store write operations, which were saved before the attack was made, in the memory unit 910, which is an original destination to store write operations.

Furthermore, when there are second sets of consecutive write operations in contiguous regions of the memory unit 910 which is an original destination to store write operations, the storing unit 900 may store the write operations in the predetermined storage unit 920 or write the write operations to the memory unit 910 which is an original destination to store write operations. To this end, the storing unit 900 operates under the control of the storage management unit 940.

Preferably, the predetermined interval at which the storage management unit 940 store the contents stored in the FIFO device 920 in the memory unit 910, which is an original destination to store write operations, is determined according to the capacity of the FIFO device 920.

Figure 10:
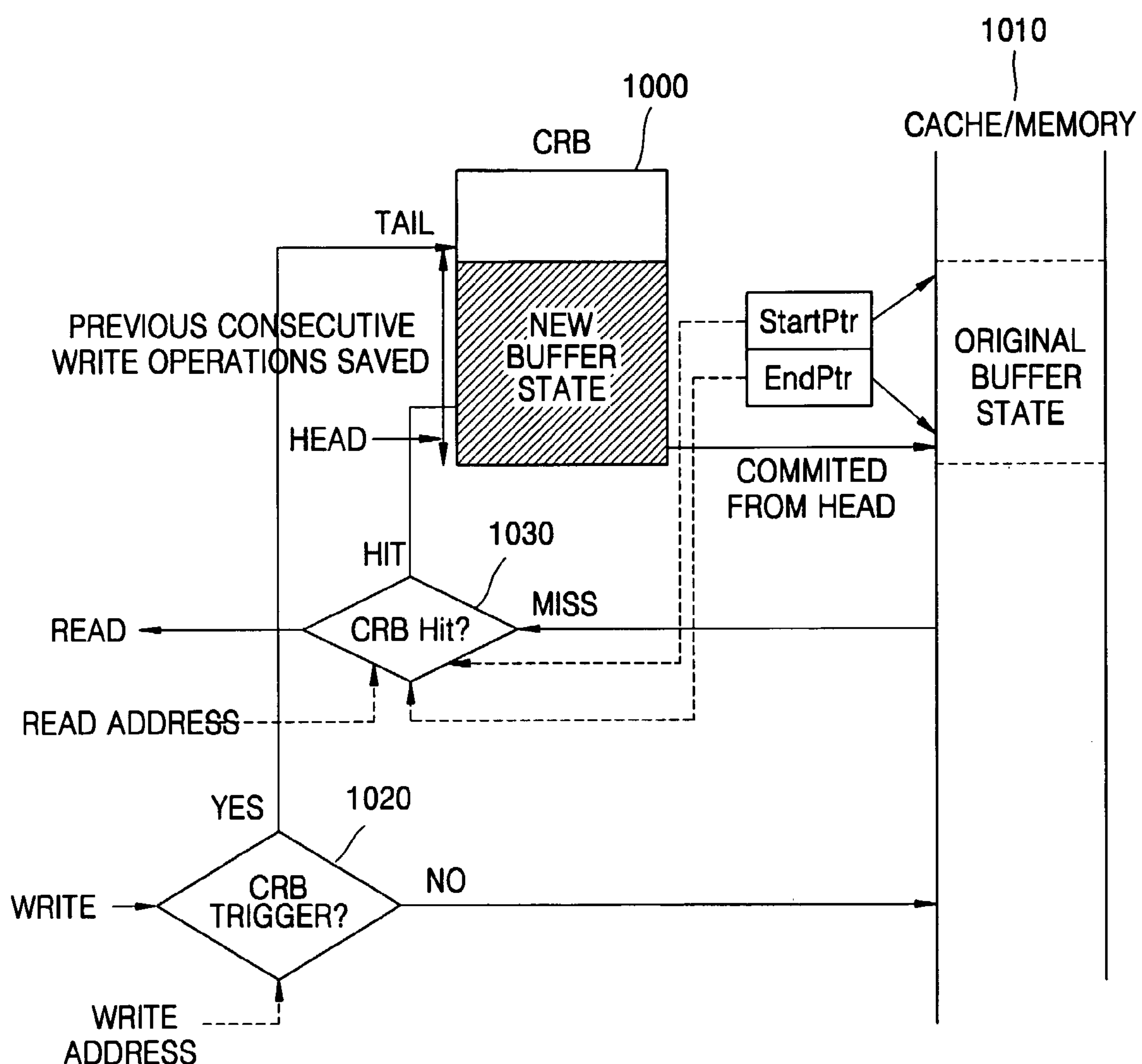
FIG. 10 illustrates a structure of a CRB constructed of a first-in-first-out (FIFO) memory according to the present invention.

FIG. 10 illustrates a structure of a CRB constructed of a FIFO memory according to the present invention. FIG. 9 and the reference numerals of elements in FIG. 9 will be referred to below for description if required.

A CRB 1000 is used to store suspicious write operations resulting from a potential buffer overflow attack. After these suspicious write operations are proved to be safe, the values of the write operations are committed to a memory 1010. Accordingly, the memory 1010 always can maintain the original state of the buffer before the attack. The memory 1010 may be implemented with an ordinary system memory or a cache memory in a CPU or connected to a CPU, without departing from the scope of the present invention in either case.

A buffer overflow attack is accompanied with the execution of consecutive write operations in contiguous regions of a memory. A single write does not cause an overflow of a buffer in a memory. Therefore, in the present invention, it is desirable that the second set of consecutive write operations in contiguous regions of the memory 1010 is regarded as the beginning of suspicious write operations. Therefore, in addition to two consecutive store operations, contiguous regions in a memory are pre-requisites to realize a suspicious attack. Hereinafter, the second set of write operations in contiguous regions of a memory will be referred to as a "CRB trigger". The storage management unit 940 writes data to the CRB in response to the CRB trigger and stores the written data in the memory 1010, which is an original destination to store such data.

When there occurs no CRB trigger, which means that no buffer overflow occurs, the storage management unit 1020 directly writes data to the memory 1010, which is an original destination memory, without need to write data to the CRB 1000. When a CRB trigger occurs, which indicates that a suspicious write operation has occurred, the storage management unit 1020 writes all write operations to the CRB 1000, in particular, to a tail part of the CRB 1000, not to the memory 1010, which is an original destination to store write operations.

When a CRB trigger is detected by the storage management unit 1020, next consecutive write operations are written to the CRB 1000, not to the memory 1010, by the storing unit 900 until the CRB trigger condition is not met. If no buffer overflow attack, i.e., no violation in a data reference safety guard apparatus, is detected by the attack detecting unit 930 while consecutive write operations are executed, the consecutive write operations stored in the CRB 1000 are regarded to be safe and committed to the memory 1010.

If a violation occurs in a data reference safety guard apparatus, the write operations saved in the CRB 1000 are unsafe and thus subsequent write operations will be ignored by the write management unit 950. Also, as in calm recovery, the processor to which the present invention is applied ignores all unsafe write operations and then continues to perform normal execution. Since the memory is not affected during the buffer overflow attack, no data and control corruptions occur.

Adding the CRB 1000 or the structure of FIG. 9 according to the present invention to an apparatus such as a processor complicates a read operation. Since the latest data may not exist in the memory, both the CRB 1000 and the memory have to be accessed for reading. This function is supported by the fetch management unit 960 or 1030.

When an address for a read operation is only in the memory 1010 ("Miss" in FIG. 10), the fetch management unit 1030 enables the data to be provided from the memory 1010. If an address for a read operation is in both the CRB 100 and the memory 1010, the data can be provided from either the CRB 1000 or the memory 1010.

If an address for a read operation is included in data written to the CRB 100 but is not yet committed to the memory 1010 ("Hit" in FIG. 10), the CRB 1000 has to provide the data. This can be simply checked by comparing the start and end pointers maintained in the CRB 1000 with the address for the read operation. As shown in FIG. 10, HEAD and TAIL indicate the oldest write and the latest write, respectively, in the CRB 1000, which are not yet committed to the memory 1010. The CRB 1000 contains only the last run of consecutive write operations, and thus the previous contents in the CRB 1000 have to be flushed to the memory before another CRB trigger conditions is met. Accordingly, the apparatus may be stalled upon detection of a CRB trigger.

Such stalling may occur due to the limited capacity of a storage device such as a FIFO device constituting the CRB 1000. If the CRB 1000 is full of data, suspicious write operations should be stalled until a piece of new data in the CRB 1000 is flushed to the memory 1010.

Similarly to this, the duration of a stall depends on the capacity of the CRB 1000. As the capacity of the CRB 1000 decreases, longer and more frequent stalling occurs.

In order to test the performance of a system to which the present invention is applied, tests using a variety of applications, such as SPEC2000 CPU Benchmark and CPU2000 Benchmark, were performed. 50 independent simulations were performed for each application using SimpleScalar 2.0 tool and a processor model including a CRB according to the present invention having a basic cache/TLB and four disordered pipelines. As a result, it was found that a 1 KB CRB is enough to eliminate all control and data corruptions with less than a 2% reduction in performance.

Thus, it is apparent that the processor to which the present invention is applied undergoes almost no performance reduction and provides a very efficient measure against a buffer overflow attack, which proves the effect of the present invention.

The above-described methods and apparatuses for detecting and recovering from buffer overflow attacks according to the present invention can be implemented in a variety of ways. For example, the present invention can be implemented as a separate chip using a device such as an ASIC or FPGA. The chip can be implemented to be used in connection with a processor such as a CPU or as an element to be installed in a buffer overflow processor.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

In addition, it will be easily understood by those of ordinary skill in the art that each operation of a method according to the present invention can be implemented using software or hardware based on general programming techniques.

Some operations in a method according to the present invention can be embodied as computer readable codes in a computer readable recording medium. The computer readable recording medium includes all kinds of data recording media storing data which can be read by a computer system.

Using the present invention, a buffer overflow attack occurring in a computer can be effectively detected, and damage of a system which is attacked can be minimized and the system can be recovered or return to the original state before the attack. A system can be effectively protected while minimizing reduction in performance of the computer system according to a method used to implement the present invention, thereby greatly improving the environments under which the computer and the Internet are used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of recovering an operation state of a processor from a buffer overflow attack, the method comprising:

(a) detecting whether a buffer overflow attack is made on any write operation while storing write operations that are potential targets of buffer overflow attacks in a predetermined location instead of an original destination to store write operations;

(b) storing the contents stored in the predetermined location at a predetermined interval in the original destination for storing write operations if no buffer overflow attack is detected and discarding unsafe write operations subsequent to a buffer overflow attack if a buffer overflow attack is detected; and (c) ignoring the unsafe write operations subsequent to the buffer overflow attack if a buffer overflow attack is detected, wherein if the original destination storing the write operations is accessed for a read operation, the original destination and the predetermined location storing the write operations are simultaneously accessed, and if an address for the read operation is included in the predetermined location storing the write operations, which are not yet stored in the original destination, data for the read operation is provided from the predetermined location storing the write operations.

2. The method of claim 1, wherein, in (b), if a buffer overflow attack is detected, write operations stored before the buffer overflow attack is made are stored in the original destination for storing the write operations.

3. The method of claim 1, wherein, in (a), if there are second sets of consecutive write operations in contiguous regions of the original destination for storing write operations, the write operations are stored in the predetermined location, and otherwise the write operations are written to the original destination.

4. An apparatus for recovering an operation state of a processor from a buffer overflow attack, the apparatus comprising:

a storing unit storing write operations that are potential targets of buffer overflow attacks in a predetermined storage unit, which is not a memory unit originally designated to store write operations;

an attack detecting unit detecting whether or not a buffer overflow attack is made on any of the write operations;

a storage management unit storing the contents stored in the predetermined storage unit in a memory unit which is originally designated to store write operations at a predetermined interval if no buffer overflow attack is detected and discarding unsafe write operations subsequent to a buffer overflow attack if a buffer overflow attack is detected;

a write management unit ignoring the unsafe write operations subsequent to the buffer overflow attack and not storing the unsafe write operations in the predetermined storage unit if a buffer overflow attack is detected; and a fetch management unit managing a read operation in the memory unit which is originally designated to store write operations, wherein if there is a read operation in the memory unit which is originally designated to store write operations, the fetch management unit simultaneously accesses the memory unit and the predetermined storage unit in which data is stored by the storing unit, and if an destination address for the read operation is in the predetermined storage unit, not in the memory unit yet, data for the read operation is provided from the predetermined storage unit.

5. The apparatus of claim 4, wherein the storage management unit stores write operations stored before the buffer overflow attack is made in the memory unit which is originally designated to store write operations if a buffer overflow attack is detected.

6. The apparatus of claim 4, wherein the storing unit stores the write operations in the predetermined storage unit if there are second sets of consecutive write operations in contiguous regions of the memory unit, which is originally designated to store write operations, and otherwise writes the write operations to the memory unit.

7. The apparatus of claim 4, wherein the predetermined storage unit in which data are stored by the storing unit is a FIFO (first-in-first-out) device.

8. The apparatus of claim 7, wherein the predetermined interval at which the storage management unit stores the contents stored in the FIFO device in the memory unit which is originally designated to store the write operations is determined according to the capacity of the FIFO device.

* * * * *